US007389684B2

(12) United States Patent
Roy

(10) Patent No.: US 7,389,684 B2

(45) Date of Patent: Jun. 24, 2008

(54) GAS LIFT FLOW SURVEILLANCE DEVICE

(76) Inventor: Jude B. Roy, 124 Banks Ave., Lafayette, LA (US) 70506

(*) Notice: Subject to any disclaimer, the term of this patent is extended or adjusted under 35 U.S.C. 154(b) by 73 days.

(21) Appl. No.: 11/589,879

(22) Filed: Oct. 31, 2006

(65) Prior Publication Data

US 2007/0114023 A1 May 24, 2007

Related U.S. Application Data

(60) Provisional application No. 60/732,660, filed on Nov. 3, 2005.

(51) Int. Cl.
*E21B 47/10* (2006.01)
*G01F 1/28* (2006.01)

(52) U.S. Cl. .................................. 73/152.29; 73/861.76

(58) Field of Classification Search .............. 73/152.29, 73/152.31, 861.74, 861.75, 861.76, 170.15
See application file for complete search history.

(56) References Cited

U.S. PATENT DOCUMENTS 2,826,914 A * 3/1958 Reiley ..................... 73/861.74
2,943,486 A * 7/1960 Osgood ................... 73/861.74
2,966,133 A * 12/1960 Hube ......................... 340/610
3,147,620 A * 9/1964 Stapler .................... 73/861.74
3,238,773 A * 3/1966 Leigh, Jr. ................. 73/170.26
3,298,230 A * 1/1967 Stover ..................... 73/861.74
3,340,733 A * 9/1967 Lasher .................... 73/861.74
3,530,714 A * 9/1970 Akeley .................... 73/861.75
4,022,061 A * 5/1977 Schendel ................. 73/861.75
4,074,097 A * 2/1978 Hutchinson et al. ..... 200/81.9 R
4,291,583 A * 9/1981 Buike ...................... 73/861.75
4,326,411 A 4/1982 Gant et al.
4,346,584 A * 8/1982 Boehringer ................. 73/23.3

(Continued)

FOREIGN PATENT DOCUMENTS

GB 2197675 5/1988

(Continued)

OTHER PUBLICATIONS http://www.ep-solutions.com/Solutions/IDM_Gas_Lift.htm "Gas Lift Optimization Solution" first retrieved on Oct. 11, 2004.

(Continued)

*Primary Examiner*—Hezron E. Williams
*Assistant Examiner*—John Fitzgerald
(74) *Attorney, Agent, or Firm*—Richard C. Litman

(57) ABSTRACT

The gas lift flow surveillance device has a paddle having a rod with a target attached to one end and a paddle block attached to the opposite end. The paddle block is pivotally disposed within a surveillance device housing body. A contact extending from the paddle block exerts pressure against a strain input area of a load cell. The load cell has a machine-readable millivolt output that changes according to a strain input from the paddle. A bottom section of the housing body has a bore defined therein that receives a threaded hex nipple, the rod passing through the nipple. The threaded hex nipple is adapted for attachment to a flow pipe National Pipe Thread (NPT) aperture for attaching the surveillance device to a flow pipe with the target in the fluid flow path.

12 Claims, 3 Drawing Sheets

U.S. PATENT DOCUMENTS

| | | | | |
|---|---|---|---|---|
| 4,604,906 | A * | 8/1986 | Scarpa | 73/861.74 |
| 4,629,004 | A | 12/1986 | Griffin | |
| 4,788,869 | A * | 12/1988 | Li | 73/861.71 |
| 4,827,092 | A * | 5/1989 | Kobold | 200/81.9 M |
| 5,735,346 | A | 4/1998 | Brewer | |
| 5,743,717 | A | 4/1998 | Schmidt | |
| 6,055,869 | A | 5/2000 | Stemme et al. | |
| 6,212,958 | B1 * | 4/2001 | Conley | 73/861.74 |
| 6,253,625 | B1 * | 7/2001 | Samuelson et al. | 73/861.71 |
| 6,305,216 | B1 | 10/2001 | Samaroo | |
| 6,516,879 | B1 | 2/2003 | Hershberger | |
| 6,536,522 | B2 | 3/2003 | Birckhead et al. | |
| 6,568,478 | B2 | 5/2003 | De Almeida | |
| 6,595,287 | B2 | 7/2003 | Fisher | |
| 6,595,294 | B1 | 7/2003 | Dalsmo et al. | |
| 6,634,426 | B2 | 10/2003 | McCoy et al. | |
| 6,705,397 | B2 | 3/2004 | Hershberger | |
| 6,745,815 | B1 | 6/2004 | Senyard, Sr. et al. | |
| 6,747,569 | B2 | 6/2004 | Hill et al. | |
| 6,758,277 | B2 | 7/2004 | Vinegar et al. | |
| 7,127,953 | B1 * | 10/2006 | Yowell et al. | 73/861.74 |
| 2003/0047308 | A1 | 3/2003 | Hirsch et al. | |
| 2003/0145986 | A1 | 8/2003 | Evans et al. | |
| 2003/0164240 | A1 | 9/2003 | Vinegar et al. | |
| 2004/0129428 | A1 | 7/2004 | Kelley | |

FOREIGN PATENT DOCUMENTS

| | | | |
|---|---|---|---|
| GB | 2334050 | | 8/1999 |
| GB | 2371817 | | 8/2002 |
| JP | 01153911 | A * | 6/1989 |
| WO | WO 9607813 | | 3/1996 |
| WO | WO 03031815 | | 4/2003 |

OTHER PUBLICATIONS http://www.rosemount.com/products/documents/rmt_advantage/m3095mvgas.html "Applying the Rosemount Model 2095MV on a Gas Lift" first retrieved on Oct. 11, 2004.

* cited by examiner

GAS LIFT FLOW SURVEILLANCE DEVICE

CROSS-REFERENCE TO RELATED APPLICATION

This application claims the benefit of U.S. Provisional Patent Application Ser. No. 60/732,660, filed Nov. 3, 2005.

BACKGROUND OF THE INVENTION

1. Field of the Invention

The present invention relates to flow meters and sensors for measuring the flow of a fluid through a conduit, and particularly to a gas flow surveillance device for the measurement of dynamic pressure in a gas lift flow operation, frequently used in oil drilling rigs.

2. Description of the Related Art

Many oil and gas exploration and production companies need to enhance the recovery of oil from wells that do not have sufficient pressure to produce without the aid of an artificial lift system. Typically, these companies use gas lift as the artificial lift to produce the well. Gas lift processes generally involve injecting gas down into an oil well. The gas aerates the oil and other fluid in the well, until the fluid exerts less pressure than the formation, so that the pressure exerted by the formation lifts the fluid in the oil column for removal at the well head. The gas is subsequently removed from the fluid. In order to optimize the production of oil using gas lift, it is necessary to continuously monitor flow rates, including any flow rate in the well bore.

Existing technology that may be deployed in this application includes intrusionary multiphase or mass flow meters, or non-intrusionary ultrasonic flow meters. These devices are generally far too expensive to be deployed in a production company environment.

Additionally, the intrusionary type devices usually offer an insufficient maximum working pressure for offshore applications, where a working pressure requirement of 5,000 psi or greater is required for instrumentation on a well's flow line. Other problems related to the aforementioned devices include the added burden of piping fabrication and construction, making installation cost prohibitive.

Moreover, the use of traditional differential flow measurement technology and products in a gas lift flow environment would introduce burdensome maintenance requirements due to the dirty nature of the flow stream, which would cause plugging of the sensing lines.

There exists a need to have an alternative gas lift flow surveillance device that does not introduce the aforementioned problems, yet is compatible with existing flow data acquisition technologies, such as Supervisory Control And Data Acquisition (SCADA) software running on Programmable Logic Controllers (PLCs), Remote Terminal Units (RTUs), and the like.

Thus, a gas lift flow surveillance device solving the aforementioned problems is desired.

SUMMARY OF THE INVENTION

The gas lift flow surveillance device has a paddle comprising a rod having a target attached to one end and a paddle block attached to the opposite end. The paddle block is pivotally disposed within a surveillance device housing body. A contact extending from the paddle block exerts pressure against a strain input area of a load cell. The load cell has a machine-readable millivolt output that changes according to a strain input from the paddle. A bottom section of the housing body has a bore defined therein that receives a threaded hex nipple, the rod passing through the nipple. The threaded hex nipple is adapted for attachment to a flow pipe National Pipe Thread (NPT) aperture for attaching the surveillance device to a flow pipe with the target in the fluid flow path, and allows the target to pivot the paddle according to the pressure exerted by the fluid, thus applying strain inputs to the load cell according to pressure in the pipe. The device accepts pressure up to 5000 psi.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
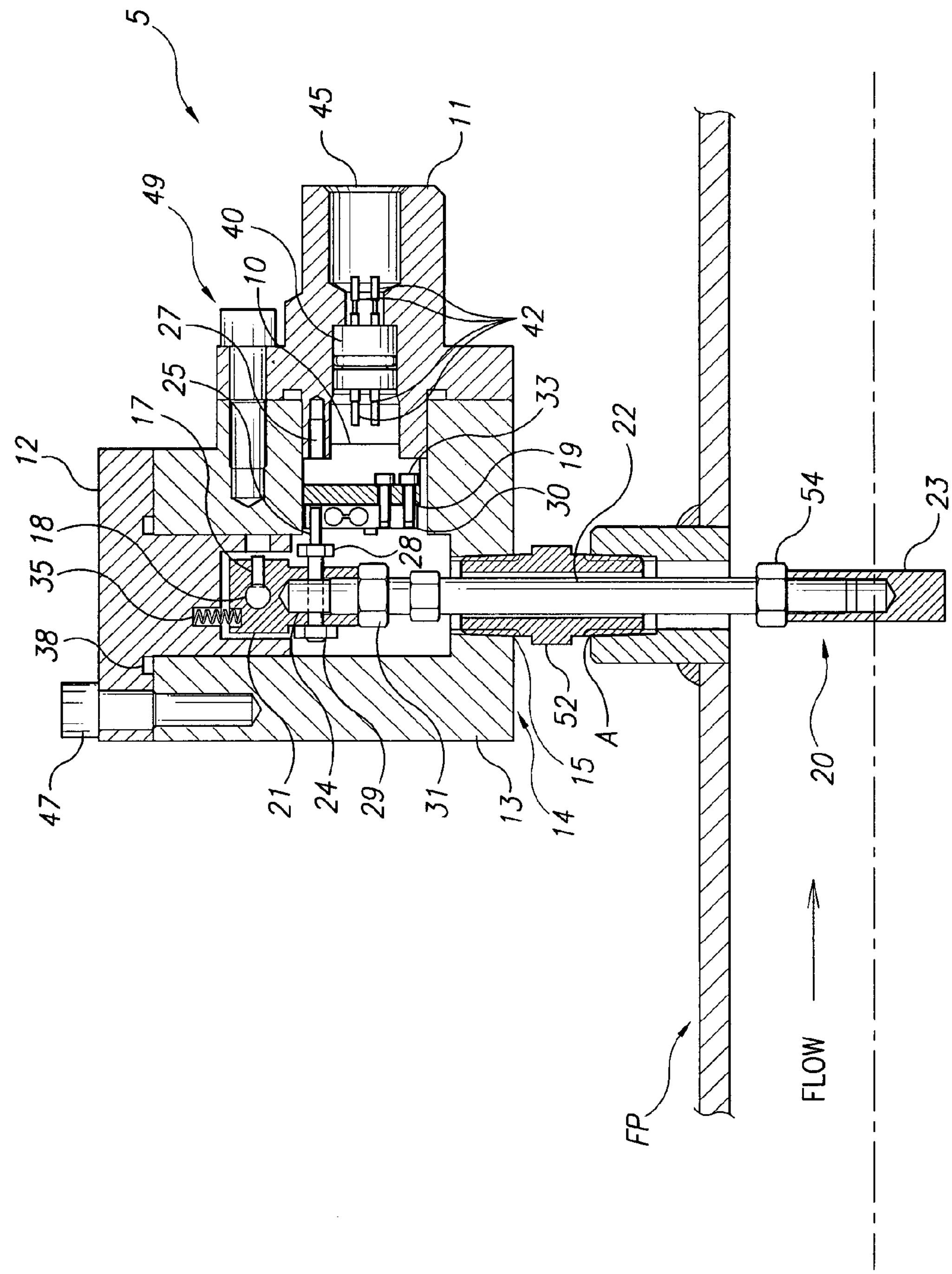
FIG. 1 is an environmental front view in section showing the gas lift flow surveillance device according to the present invention attached to a gas lift pipe.

As shown in FIG. 1, the present invention is a gas lift flow surveillance device, designated generally as 5 in the drawings, that has a target 23 that attached to a free end 20 of a rod 22 by an attachment nut 54. The end 24 of the rod 22 opposite the target 23 has a paddle block 21 attached thereto, which is pivotally disposed within a surveillance device housing body 13, which is attachable to a flow pipe FP or other conduit. The target 23, the rod 22, and the paddle block 21 form what is referred to herein as a paddle.

The target 23 may be any shape that presents a flat surface or face of known surface area that the fluid impacts against as it flows through the pipe FP. The trailing face of the target 23 may have any shape designed to minimize turbulence. For example, target 23 may be generally cylindrical, but having flats formed 180° apart, one of the flats positioned as the leading face so that the flow is directed to impact against the flat, the other flat being the trailing face facing in the direction of fluid flow, the round surfaces being disposed laterally. Alternatively, the target 23 may be wing-shaped, having a flat surface as the leading face upon which the fluid impacts, and a tapered or arrowhead shape as a trailing face pointing towards the direction of fluid flow. The above examples should be viewed as exemplary only, the target 23 having any shape having a flat leading face, the remainder of the target body being shaped to minimize turbulence, vortices, and the like that might affect pressure or flow measurements.

Figure 3:
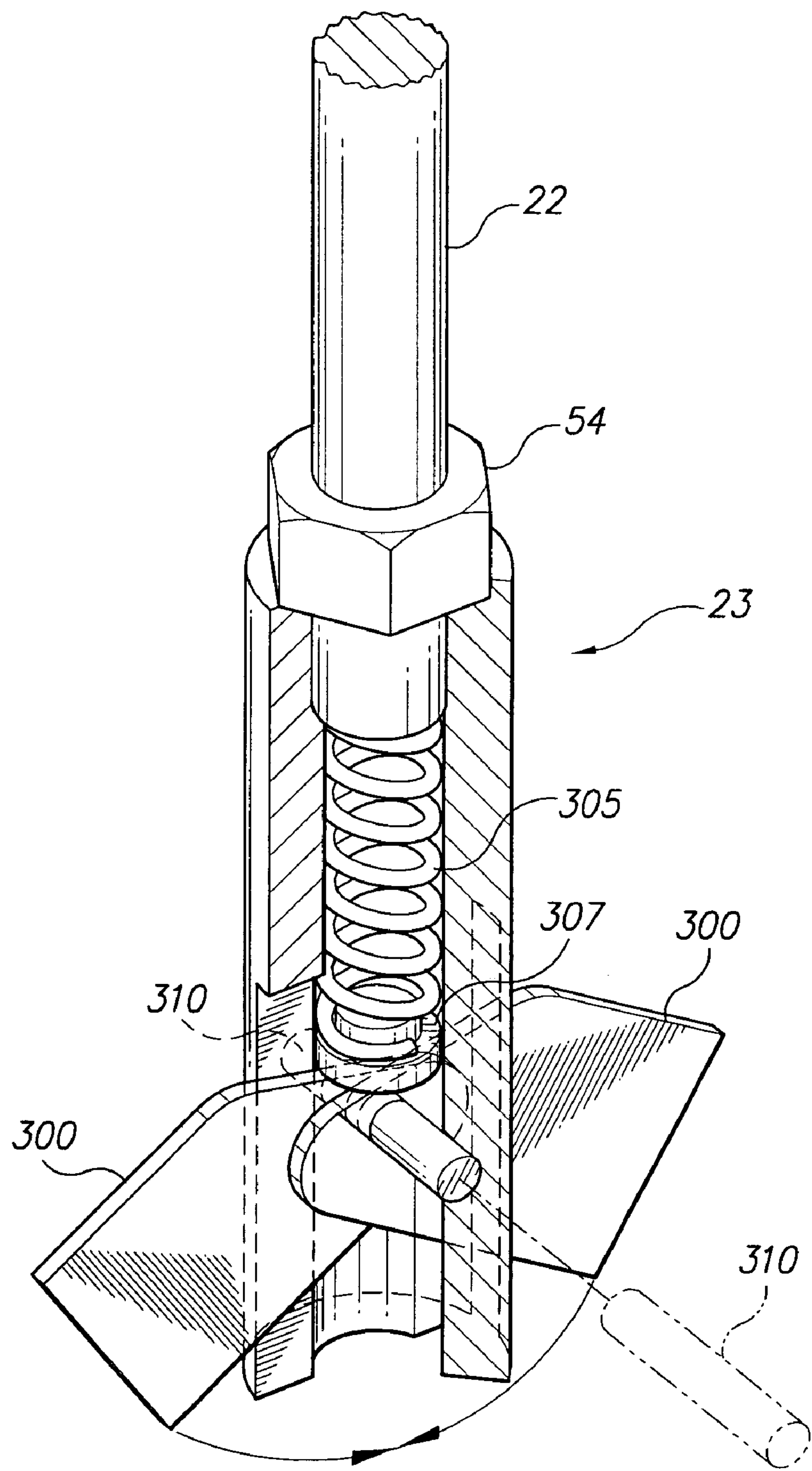
FIG. 3 is a partial perspective view of an alternative embodiment of a target at the lower end of the paddle of a gas lift flow surveillance device according to the present invention, with the lower end of the paddle broken away and in section to show details of the target.

In the embodiment shown in FIG. 3, the target 23 may have a bore that houses wings 300. The wings 300 have through-bores through which a retaining pin 310 can extend, the retaining pin 310 extending transversely through the target 23 and forming a pivotal attachment point of the wings 300 within the target body 23.

Longitudinally disposed slots are formed on the target body through which the wings 300 can extend away from, and retract within, the target body 23 by pivoting about the retaining pin 310. A piston 307 has a head that contacts the shoulders of the wings 300 above their pivot point. A spring 305 is concentrically disposed about the shaft of the piston 307 and bears against the head of the piston 307, biasing the piston to exert a camming action against the shoulders of the wings 300 that causes the wings 300 to extend through the slots. The wings 300 may be pressed into the bore defined by the target body 23, compressing spring 305, for insertion through a narrow diameter passage through the flow pipe FP, the spring 305 then expanding to extend the wings 300 into the flow path to provide a target 23 having a greater surface area.

The paddle has a paddle block 21 secured to end 24 of rod 22. The paddle block 21 pivots on pivot pin 18 and is restrained from axial movement by pivot pin set screw 17.

Additionally, the paddle block 21 has a detent or blind bore in which an end of paddle block damping spring 35 fits, the other end of the spring 35 being disposed in a bore defined in the top cap 12 of the housing 13. The top cap 12 is attached to the housing body 13 by top cap mount screw 47. To maintain a pressure seal, an O-ring 38 is sandwiched between the top cap 12 and body 13. Paddle block damping spring 35 is provided to limit pivotal oscillations as the paddle 22 pivots laterally back and forth in response to pressure applied to the target 23.

The paddle is provided with a contact for exerting pressure against a strain input area of a load cell 30 as the paddle pivots in response to pressure exerted by the flow of fluid in the pipe FP. A preferable contact means comprises a hex head screw 28 extending from paddle block 21, the screw extending through paddle block 21 and paddle 22, being retained by paddle rod point of contact nut 29.

The head of the screw 28 is positioned so that it comes into contact with the strain input area of the load cell 30. Strain force is transmitted from the paddle 22 to the load cell 30 by contact of screw head 28 with a load cell set screw 25, which is threaded into the strain input area of the load cell 30.

The load cell 30 is fixedly attached to the housing body 13 by two load cell mounting screws 33 through load cell mount 10 and a vertically disposed shim 19. A side cap mount 11 containing a horizontally disposed electrical feedthrough 40 and a horizontally disposed NPT outlet 45 is attached to the body 13 by side cap mount screw 49. The side cap mount 11 attachment to the housing body 13 is sealed with an O-ring similar to O-ring 38. The feedthrough 40 and the NPT outlet 45 accommodate four electrical power and output conductors 42 provided for operation of the load cell 30. The load cell 30 has a machine-readable millivolt output that changes according to a strain input from the paddle 22. The load cell 30 is a device well known to those skilled in the art that produces a millivolt output proportional to a force or pressure exerted on the strain input area, e.g., by a Wheatstone bridge circuit. An exemplary load cell 30 that may be incorporated into the gas lift flow surveillance device 5 is an Ultra-Low Profile Single Point Load Cell model number S215, made by Strain Measurement Devices of Meriden, Conn.

Figure 2:
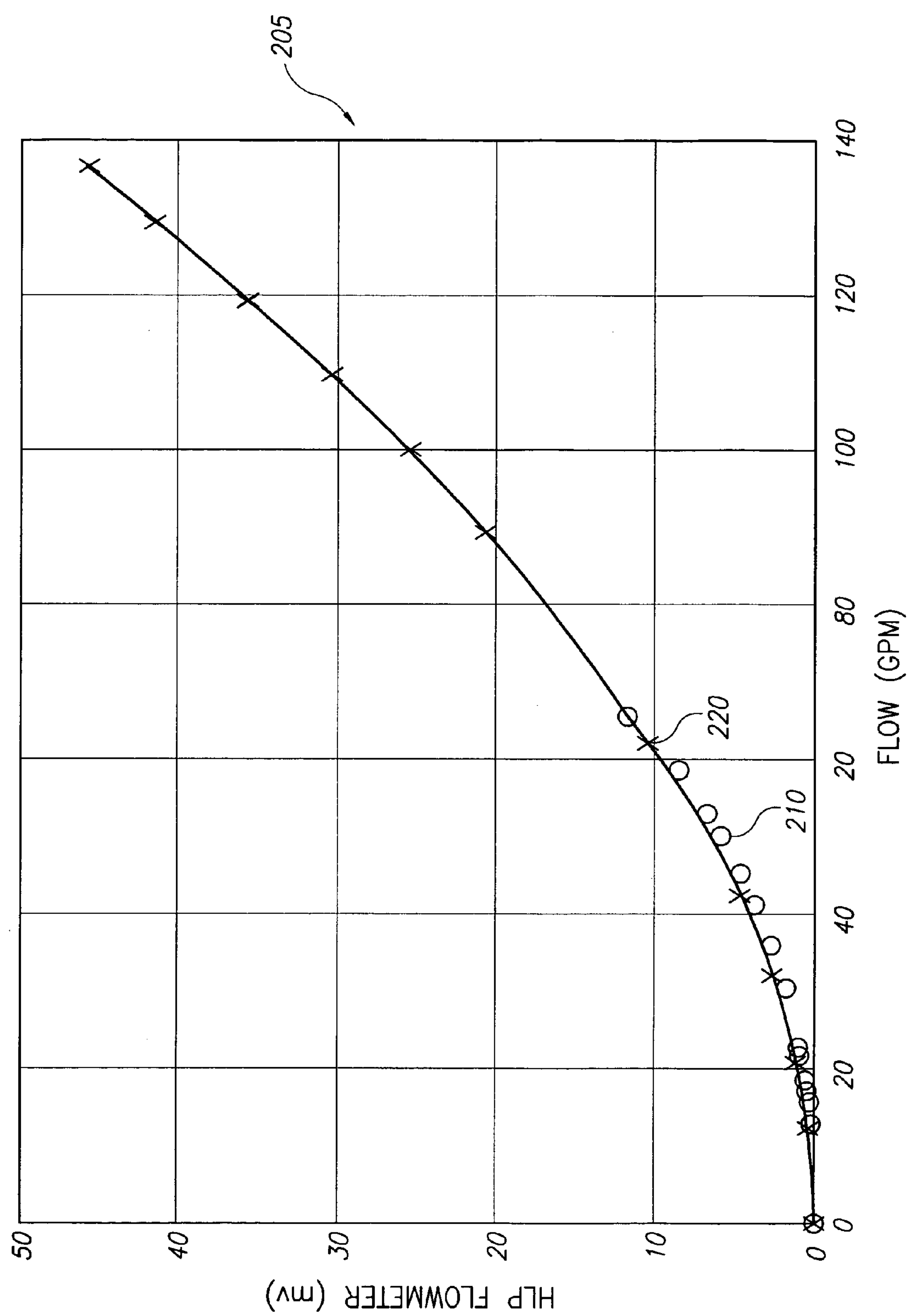
FIG. 2 is a flow meter calibration plot of the gas lift flow surveillance device according to the present invention.

As illustrated in FIG. 2, calibration results 205 show that flow meter millivolt output varies as the square of the flow applied to the surveillance device 5. Two inch master meter data points 220 and one inch master meter data points 210 both confirm the results 205. The machine readable millivolt output of load cell 30 is compatible with analog input interfaces to flow data acquisition systems utilizing, for example, Supervisory Control And Data Acquisition (SCADA) software running on Programmable Logic Controllers (PLCs), Remote Terminal Units (RTUs), and the like.

A bottom section 14 of the housing body 13 has a threaded bore 15 defined therein. An NPT threaded hex nipple 52 is threaded into bore 15 and defines a conduit through which rod 22 passes, so that target 23 extends from the nipple 52. The nipple 52 threadedly attaches to a National Pipe Thread (NPT) aperture, such as, for example, a one-half inch NPT process insertion point A of a flow pipe FP, and allows the target 23 to pivot the paddle, thus applying strain inputs to the load cell 30 responsive to a multiphase flow pressure in the flow pipe FP. Advantageously, NPT is a standard that uses tapered threads that form a seal as the threads compress against each other. NPT fittings are more easily made leak proof, especially with the addition of sealing compounds. Due to the aforementioned advantages of NPT fittings, the NPT process insertion point fitting at NPT threaded hex nipple 52 of the present invention provides a high pressure rating, thus allowing. the surveillance device 5 to accept and measure flow pressure ranging from below 5000 psi to a value up to 5000 psi.

The gas lift flow surveillance device can be attached to a well flow line at any desired point, e.g., downstream of the well head, in order to continuously monitor pressure in the oil reservoir so that the flow of gas injected into the well can be adjusted for maximum efficiency. The millivolt output of the load cell 30 may be connected to a computer having software that calculates the pressure from the deflection from the paddle, known leading surface area of the target 23, and cross-sectional diameter of the flow pipe FP. From the pressure, the software may further calculate the volumetric flow rate, mass flow rate, and other parameters of interest for maximizing efficiency of the gas lift assembly.

It is to be understood that the present invention is not limited to the embodiment described above, but encompasses any and all embodiments within the scope of the following claims.

I claim:

1. A gas lift flow surveillance device, comprising:

a housing defining a cavity, the housing having a bottom wall having a threaded bore defined therein;

a pipe nipple having opposite ends externally threaded with NPT threads, the nipple defining a conduit, one end of the nipple being threaded into the threaded bore defined by the housing, the opposite end being adapted for attachment to an NPT access port on a flow pipe;

a paddle having:

an elongated rod having a first end and a second end, the rod extending through the conduit defined by the nipple;

a paddle block attached to the first end of the rod, the paddle block being pivotally mounted within the cavity defined by the housing; and a target attached to the second end of the rod below the nipple, the target having a flat leading face defining a cross-sectional area, the target being adapted for being disposed in the flow pipe with the leading face positioned to receive impact from fluid flowing in the pipe;

a load cell attached to the housing, the load cell having a strain input area and having means for producing a millivolt output as a function of the pressure exerted on the strain input area; and a contact extending from the paddle block, the contact bearing against the strain input area of the load cell.

2. The gas lift flow surveillance device according to claim 1, wherein said target is a cylindrical body having flats formed 180° apart, one of the flat surfaces being positioned as a leading face, so that flow is directed against the leading face flat, the other flat being a trailing face positioned to face in the direction of fluid flow, the round surfaces being disposed laterally.

3. The gas lift flow surveillance device according to claim 1, wherein the target is wing shaped, having a flat surface upon which the fluid impacts, and a tapered trailing face pointing in the direction of fluid flow.

4. The gas lift flow surveillance device according to claim 1, wherein the contact further comprises a screw extending from the paddle block, the screw extending through the paddle block and the paddle, the head of the screw being positioned so that the screw head comes into contact with the strain input area of the load cell.

5. The gas lift flow surveillance device according to claim 1, further comprising two load cell mounting screws, a load cell mount, and a vertically disposed shim attaching said load cell to said housing.

6. The gas lift flow surveillance device according to claim 1, wherein the flow meter millivolt output varies as the square of a fluid flow applied to said target.

7. The gas lift flow surveillance device according to claim 1, wherein the millivolt output of the load cell is capable of providing sensor input to flow data acquisition systems utilizing a Supervisory Control And Data Acquisition software suite.

8. The gas lift flow surveillance device according to claim 1, wherein said target has a body having an axial bore and opposed longitudinal slots defined therein, said target further comprising:

a pair of wings having shoulders;

a retaining pin pivotally joining the wings, the retaining pin extending transversely through the target body, the wings pivoting between an extended position in which the wings extend through the slots and a retracted position in which the wings are disposed within the bore defined in the target body;

a piston having a head bearing against the shoulders of the wings and a shaft extending from the head; and a spring bearing against the head of the piston, the spring biasing the wings to the extended position;

whereby the wings are compressible within the bore for insertion through a passage in the flow pipe, the spring forcing the wings to the extended position after insertion so that the target presents a greater surface area exposed to fluid flow in the flow pipe.

9. The gas lift flow surveillance device according to claim 1, further comprising:

a pivot pin, the paddle block being pivotally attached to the pivot pin; and a pivot pin set screw threadably attached to the pivot pin above the paddle block in order to restrain axial movement of the paddle block along the pivot pin.

10. The gas lift flow surveillance device according to claim 9, further comprising:

a top cap attached to the housing the top cap and the paddle block each having a blind bore defined therein;

a paddle block damping spring disposed the bores defined in the paddle block and the top cap; and an O-ring pressure seal being disposed between the top cap and the housing.

11. The gas lift flow surveillance device according to claim 1, further comprising:

a side cap mount having an electrical feedthrough defined therein; and an NPT outlet attached to said housing.

12. The gas lift flow surveillance device according to claim 11, further comprising an O-ring seal between said side cap and said housing.

* * * * *